(12) United States Patent
Gres

(10) Patent No.: US 8,211,200 B2
(45) Date of Patent: Jul. 3, 2012

(54) CONTROLLED RELEASE NITROGENOUS FERTILIZER COMPOSITION SYSTEM

(75) Inventor: Edward M. Gres, Toronto (CA)

(73) Assignee: Mitanic, Inc., Bradford, Ontario (CA)

( * ) Notice: Subject to any disclaimer, the term of this patent is extended or adjusted under 35 U.S.C. 154(b) by 0 days.

(21) Appl. No.: 13/125,011

(22) PCT Filed: Oct. 16, 2009

(86) PCT No.: PCT/CA2009/001471
§ 371 (c)(1),
(2), (4) Date: Apr. 19, 2011

(87) PCT Pub. No.: WO2010/045712
PCT Pub. Date: Apr. 29, 2010

(65) Prior Publication Data
US 2011/0219834 A1     Sep. 15, 2011

Related U.S. Application Data

(60) Provisional application No. 61/107,430, filed on Oct. 22, 2008.

(51) Int. Cl.
| | |
|---|---|
| *C05F 3/00* | (2006.01) |
| *C05F 3/02* | (2006.01) |
| *C05C 9/00* | (2006.01) |
| *C05C 13/00* | (2006.01) |
| *C05C 1/00* | (2006.01) |
| *C05C 11/00* | (2006.01) |

(52) U.S. Cl. ............ 71/16; 71/21; 71/28; 71/30; 71/54; 71/58; 71/61; 71/64.03; 71/64.04; 71/64.1; 71/64.11

(58) Field of Classification Search ............... 71/28, 29, 71/30, 54, 58, 59, 60, 61, 64.11, 64.1, 64.03, 71/64.04, 16, 21
See application file for complete search history.

(56) References Cited

U.S. PATENT DOCUMENTS

| | | | | |
|---|---|---|---|---|
| 2,926,146 | A * | 2/1960 | McCully | 521/37 |
| 3,270,003 | A * | 8/1966 | Van Blaricom et al. | 549/212 |
| 6,336,949 | B1 * | 1/2002 | Patra et al. | 71/28 |
| 6,458,747 | B1 * | 10/2002 | Kulik | 504/140 |
| 2010/0058822 | A1 * | 3/2010 | Bargiacchi | 71/17 |

FOREIGN PATENT DOCUMENTS

| | | |
|---|---|---|
| AU | B1-60 945/80 A1 | 11/1980 |
| EP | 0 968 980 A2 | 1/2000 |
| EP | 1 464 635 A1 | 10/2004 |

OTHER PUBLICATIONS

Mitanic et al., International Search Report and Written Opinion of the International Searching Authority (, issued in parent International Patent Application No. PCT/CA2009/001471, Jan. 5, 2010, 7 pages.

* cited by examiner

*Primary Examiner* — Wayne Langel
(74) *Attorney, Agent, or Firm* — David A. Farah; Sheldon Mak & Anderson PC

(57) ABSTRACT

A controlled release nitrogenous fertilizer composition system, comprising (a) a tannin selected from the group consisting of purified tannins, purified modified tannins, condensate tannins, and mixtures thereof; (b) a nitrogenous fertilizer component selected from the group consisting of an ammonia fertilizer, an ammonium fertilizer, a urea fertilizer, a nitrogen containing fertilizer, a natural nitrogen containing organic fertilizer, a nitrogen containing waste product fertilizer, a slow and control release fertilizer, and mixtures thereof; and optionally (c) a carrier. Also disclosed is a method for making such fertilizer composition systems.

27 Claims, No Drawings

US 8,211,200 B2

CONTROLLED RELEASE NITROGENEOUS FERTILIZER COMPOSITION SYSTEM

CROSS-REFERENCE TO RELATED APPLICATIONS

This application is a national stage of International Patent Application No. PCT/CA2009/001471 which claims the benefit of the filing date of U.S. Provisional Patent Application No. 61/107,430 filed Oct. 22, 2008 under the title CONTROLLED RELEASE NITROGENEOUS FERTILIZER COMPOSITION SYSTEM, the contents of which are incorporated herein by reference in their entirety.

FIELD OF THE INVENTION

The present invention relates to controlled release nitrogenous fertilizer compositions and processes for the preparation of same. More particularly, the invention relates to controlled release ammonium sulphate and urea fertilizer compositions and process for the preparation of the said compositions wherein purified tannin, or a tannin derivative, is incorporated into the nitrogenous fertilizer. The tannin is thought to act as a natural source nitrification inhibitor and fertilizer conditioner, and reduce, prevent, or delay nitrate leaching of the nitrogenous fertilizer, and reduce and delay bacterial denitrification of the bacterial originated nitrate ion form of the fertilizer.

BACKGROUND OF THE INVENTION

Plants require Nitrogen (N) to grow. Nitrogen is abundant in its atmospheric form, $N_2$ (nitrogen gas), which makes up 78 percent of our atmosphere. However, most plants cannot use nitrogen in this form, but $N_2$ can be transformed into several other compounds that plants can use. The form and movement of Nitrogen through the nitrogen cycle are greatly influenced by soil bacterial action on various Nitrogen compounds and by components of the local ground water systems. These are various forms of N that relate to one another through many complex interactions of various forms of nitrogen, including: atmospheric nitrogen ($N_2$), ammonia ($NH_3$), ammonium ion ($NH_4^+$), nitrite ion ($NO_2^-$), and nitrate ion ($NO_3^-$). Each N form has properties that affect plant utilization of N.

Non-leguminous plants, such as grass pasture, corn, and most fruit and vegetable crops, must rely on either bacteria that live in the soil to "fix" the nitrogen from the atmosphere, or to convert nitrogen from decomposing organic matter, or to convert nitrogen from applied fertilizers into suitable useable forms of nitrogen which plants can take up through their roots. The most common forms of nitrogen that plants can use are ammonium ions ($NH_4^+$) and nitrate ions ($NO_3^-$).

Ammonium-based fertilizers are used to provide plants with N. Unfortunately, soon after application to soil, ammonium based fertilizers disassociate to form ionic components in soil water to form ammonium ions which are converted to the nitrite; nitrate forms rather quickly by nitrifying bacteria, believed to be bacteria such as nitrosomonas and nitrobacter.

Legumes for example alfalfa, clover, soybeans and peanuts, have nodules on their roots that contain bacteria that fix atmospheric nitrogen into a usable form for the plant without the need for as much, if any, nitrogenous fertilizer compared to non-leguminous plants. When ammonium sulphate solubilizes the resultant ammonium ions ($NH_4^+$), have a positive charge, and as a result attach to the negatively charged soil particles.

Nitrogen can become unavailable to plants primarily because of rapid nitrification followed by leaching in wet soils, or by washout because of heavy rainfall. This important means of nitrogen loss is by nitrate leaching. Leaching occurs when the water-soluble nitrate ion moves through the soil as water percolates downward beyond the reach of plant roots.

Another important means of nitrogen loss is through rapid denitrification. Compacted wet soils contain little oxygen and denitrifying bacteria that are active under anaerobic conditions remove the oxygen from the nitrogenous products of nitrification of ammonia, such as nitrite ($NO_2^-$) ions and nitrate ($NO_3^-$) ions for their own use, releasing $N_2$ and/or $N_2O$ back to the atmosphere.

One of the problems with Nitrogen loss from chemical fertilizers vs. organic Nitrogen containing fertilizers are that fast release high Nitrogen fertilizers such as ammonium salts, nitrates, or urea are water soluble and are quickly assimilated by various enzymes and nitrifying bacteria, and denitrifying bacteria resulting in loss of Nitrogen by nitrate leaching to aquifers, by wash outs as surface run-off due to heavy rains, or by quick release of Nitrogen containing gases or greenhouse gases.

There has been much progress to slow the breakdown by bacteria of nitrogenous fertilizers, resulting in a number of commercial categories being developed for these slow release N or controlled release N fertilizers such as sulphur coated ureas, resin coated nitrogenous products, slow release urea formaldehyde nitrogen fertilizers, and organic fertilizers such as fish meal.

Each of these slow release or controlled release fertilizers have their own disadvantages. For example, sulphur coated urea fertilizers slow the availability of nitrogen, but once the sulphur type combination wax coating is gone the release of the underlying urea Nitrogen is rapid. Resin or compound coated fertilizers may in fact be too slow to release nutrients over the growing season. Slow release urea formaldehyde fertilizers are designed to give two stages of Nitrogen release, rapid release from free urea, and timed release because of condensation reaction of part of the urea with formaldehyde, but the final timed stage may release free formaldehyde emissions. Other slow release Nitrogen urea fertilizers produced by unique polymerization or condensation of urea with an aldehyde, normally formaldehyde, are crotonylidinediurea (CDU) and isobuitlidene diurea (IBDU). Organic fertilizers such as protein based fish meal are expensive and not available for large scale commercial use.

In addition to the above commercial categories for slow or controlled release of Nitrogen fertilizers, a number of chemicals have been found to inhibit nitrification of nitrogenous fertilizers. Nitrification inhibitors restrict the microbiological oxidation of ammonium ions to nitrate ions thereby reducing the loss of N from nitrification, by leaching, and by early denitrification. The literature on nitrification inhibitors is very extensive as outlined by Patra in U.S. Pat. No. 6,336,949, Jan. 8, 2002, wherein it was discovered essential oils inhibited the hydrolysis of urea by urease enzymes, and hence retarded nitrification of the urea. Another known nitrification inhibitor is nitrapyrin (2-chlor-6-trichloromethyl pyridine). Following its invention, a series of chemicals, including BHC, sodium azide, sodium chlorate, dicyandiamide (DCD), thiourea AM (2-amino-4 chloro-6 methyl pyridine), ATC (4 amino-1, 2,4 triazole), and N-serve have also been identified as nitrification inhibitors (Sahrawat et al 1989, Adv. Agrron. 42:279-309). DCD (Dicyandiamide), a chemical normally derived from coal by-products, is a commercially sold as an ammonical nitrogen nitrification inhibitor. However, it is difficult to source, and in short supply because there are few manufacturers of DCD outside of China and Germany. EP patent publication 0030019242 describes use of hydrolysable tannins as a potential nitrification inhibitor in fertilizer, however, hydrolysable tannins are expensive and difficult to source commercially.

Tannins, sometimes referred to as polyphenols, are naturally occurring polyphenolic polymers extracted from tannin containing vegetable, plant and forestry products. Tannic acid, a derivative of tannin, is known to have a strong effect on bacteria in the medical field. Tannins are classified as hydrolysable tannins and condensate tannins. Hydrolysable tannins are constituted by galic acid ester compounds and ellagic acid ester compounds with a sugar, usually glucose, and they can be hydrolysed by acids into monomeric compounds and enzymes. Condensate tannins, which are called polyflavanoids, and sometimes referred to in the present specification as condensed tannins, have a completely different chemical structure. They are comprised of a polyhydroxylflavonol polymer group, with carbon to carbon bonds between their sub units.

Hydrolysable tannins, such as those found in the leaves of certain shrubs such as tea, were presumed to have nitrogen nitrification inhibitory properties by earlier investigators. Tea waste has been reported to retard nitrification (Sahrawat et al 1989, Adv. Agron. 42:279-309). Experimental soil application of tea waste from tea production tables in tea factories did inhibit some urea nitrogen nitrification, but fared inefficient compared to N-serve, or neem cake, S. M Arafat, Pakistan Journal of Bilogical science 2(4): 1184-1187, 1999.

Bargiachhio et al in European patent application EP 20030019242 teaches methods for using organic hydrolysable tannin extracts in agriculture, such methods including water leaching of tannins and sugars out of wood based matter, drying the leachate, and using the dried leachate to coat fertilizers in a rotary drum, or using the extracts to add to solution and suspension fertilizers, or for use and application by fertigation, or fertilizing through irrigation systems. However, Bargiachhio uses natural sugars, starch, lactose, bran, or carbohydrates in the taught fertilizers, and therefore the methods used by Bargiachhio can actually cause the quicker onset of denitrification of nitrates to greenhouse gases more quickly because denitrification bacteria require additional carbon to multiply. In addition, Bargiachhio teaches use of hydrolysable tannins, and the use of high ratios of tannin to nitrogen, resulting in high cost.

Most other nitrification inhibitors currently known or in use are synthetic chemicals, expensive, and have undesirable environmental side effects.

Hence there is a need for a natural, inexpensive nitrification inhibitor, and/or a fertilizer having such an inhibitor.

SUMMARY OF THE INVENTION

According to one aspect of the invention is provided a controlled release nitrogenous fertilizer composition system, comprising: (a) a tannin selected from the group consisting of a purified tannin, a purified modified tannin, a condensate tannin, and mixtures thereof; and (b) a nitrogeneous fertilizer component selected from the group consisting of an ammonia fertilizer, an ammonium fertilizers, a urea fertilizer, a nitrogen containing fertilizer, a natural nitrogen containing organic fertilizer, a nitrogen containing waste product fertilizer, a slow and control release fertilizer, and mixtures thereof.

In one embodiment, the tannin is a condensate tannin, for example, mimosa tannin, pine tannin, quebracho tannin, hemlock tannin, mangrove bark tannin, gambier tannin, or mixtures thereof.

In a further embodiment, the controlled release nitrogeneous fertilizer system consists essentially of the tannin and the nitrogeneous fertilizer.

In yet a further embodiment, the controlled release nitrogeneous fertilizer system further comprises a carrier.

In yet a further embodiment, the controlled release nitrogeneous fertilizer system consists essentially of the tannin, the nitrogeneous fertilizer, and the carrier.

In yet a further embodiment, the carrier may be or comprise formaldehyde, for example, as from 0.5 to 1.5% (w/w) of the system.

In yet a further embodiment, the weight ratio of the tannin to the nitrogeneous fertilizer is from 0.1:99.9 to 10:90, for example, from 1:99 to 4:96, 2:98 to 3:97, or 0.1:1 to 0.001:1.

In yet a further embodiment, the nitrogeneous fertilizer component is an ammonium fertilizer for example, ammonium sulphate fertilizer, urea ammonium nitrate liquid fertilizer, anhydrous ammonia, aqueous ammonia, diammonium phosphate, or monoammonium phosphate.

In yet a further embodiment, the nitrogeneous fertilizer component is a nitrogen containing waste fertilizer, for example, manure or animal excretia.

In yet a further embodiment, the nitrogeneous fertilizer component comprises a urea fertilizer, for example, formaldehyde conditioned urea granules or prill fertilizer, or a solution of fertilizer containing urea.

In yet a further embodiment, the controlled release nitrogeneous fertilizer system is a solid particulate.

In yet a further embodiment, 90% w/w of the solid particulate has a size which is 200 mesh or smaller, and the remaining 10% w/w of the solid particulate, based on the total weight thereof, have a size which is between 200 mesh and 30 mesh.

In yet a further embodiment, 99.5% w/w of the solid particulate has a size between 4-100 mesh, and the remaining 0.5% w/w of the solid particulate, based on the total weight thereof, has a size which is smaller than 100 mesh.

In another aspect of the present invention is provided a method for the manufacturing of a controlled release nitrogeneous fertilizer comprising adding a tannin or a tannin derivative to a melt, crystalline, or particulate finely divided form of an ammoniacal nitrogeneous fertilizer.

In a further embodiment, following the addition of tannin, a compacting step, a grinding step, and/or a screening step, is provided, to form homogeneous granules.

In yet a further embodiment, following the addition of tannin, a granulation step is provided wherein the fertilizer is granulated to form homogeneous granules.

In yet a further embodiment, primary nutrient elements and/or micronutrients are added during the granulation step.

In an other aspect of the present invention is provided a method for the manufacturing of a controlled release nitrogeneous fertilizer comprising an addition of a purified tannin or a tannin derivative, plus a carrier comprising water or a liquid acid, to a nitrogeneous fertilizer.

In another embodiment, the tannin or tannin derivative is added at a concentration of between 0.1-10% (w/w) of the ammoniacal nitrogeneous fertilizer.

In yet a further embodiment, the ammoniacal nitrogeneous fertilizer is selected from an ammonia fertilizer, an ammonium fertilizers, a urea fertilizer, a nitrogen containing fertilizer, a natural nitrogen containing organic fertilizer, a nitrogen containing waste product fertilizer, a slow and control release fertilizer, and mixtures thereof.

In an other aspect of the present invention is provided a method for the manufacturing of a controlled release nitrogeneous fertilizer comprising an addition of a tannin or a tannin derivative to a urea melt to produce homogeneous conditioned granules or prills of urea.

In a further embodiment, the urea melt further comprises formaldehyde.

In yet a further embodiment, the tannin or tannin derivative is added at a concentration of between 0.1-10% (w/w) of the urea.

In another aspect of the invention is provided a method for the manufacturing of a controlled release nitrogeneous fertilizer comprising: (a) dissolving a tannin or a tannin derivative in a water carrier; (b) applying the tannin or tannin derivative to a manure or an animal excretia fertilizer, either before or after field application of said fertilizer.

In yet a further embodiment, the tannin or modified tannin is a condensate tannin, a hydrolyzable tannin, or a solution or mixture thereof.

In yet a further embodiment, the tannin or modified tannin is a condensate tannin.

In yet a further embodiment, the tannin is a mimosa tannin.

DETAILED DESCRIPTION

The present inventor has surprisingly found that purified condensate tannin can be used to condition nitrogen containing fertilizers prior to soil or aqueous application, in particular where the particulate tannin or tannin derivative is added directly to the fertilizer melts, or fertilizer particulate during manufacture. Surprisingly relatively small amounts of a purified condensate tannin such as mimosa tannin (i.e. between 0.1-5% w/w of the nitrogenous fertilizer) has been found to efficiently inhibit nitrifying bacterial action on ammonium containing fertilizers by 1.5-3 weeks longer vs. untreated control fertilizers.

A second surprising finding is that condensate tannin inhibited the nitrification of tannin-conditioned urea applied to soil by about 3-4 weeks longer than the control untreated urea.

Thus, the inventor has discovered that concentrated and purified mimosa tannin, for example, a spray dried mimosa tannin, can be used as a conditioning agent to be incorporated into or onto a nitrogen-based fertilizer, before soil or usage application, to make an improved final fertilizer composition.

The nitrogen-based fertilizer component can be, for example, anhydrous and aqueous ammonia, inorganic ammonium salts such as ammonium phosphate (diammonium phosphate (DAP), monoammonium phosphate (MAP)), ammonium nitrate and ammonium sulphate, ammonium salts of organic acids, urea, urea ammonium nitrate (UAN), cyanamide, guanidine nitrate, dicyandiamide (DCD), amino acids, guanyl urea sulphate, thiourea, amines, urea formaldehyde polymer and other nitrogen containing organic chemical fertilizers as well as protein mixtures, green manure, fish products, crop residues and other natural materials known to be sources of N or ammonium ions, and or various combinations of the foregoing.

A nitrification inhibiting effective amount of tannin is an amount of one or more types of tannin or tannin compounds which, when admixed, or homogeneously mixed, or incorporated into ammonium nitrogenous fertilizer in an amount sufficient to inhibit the nitrification of ammonium nitrogen to nitrate nitrogen to any extent longer than untreated nitrogenous fertilizer. Herein it has been discovered that the addition of a purified mimosa tannin conditioner, preferably sourced as a spray dried mimosa tannin, is superior to that of other natural polyphenolic nitrification inhibitors such as hydrolysable tannins such as tea waste leaves that are ploughed into the soil, or Bargiachhi's unrefined tannin wood extract solution (EP 20030019242). Mimosa tannin is readily available in commercial amounts, sourced from the bark of mimosa trees that are harvested for lumber and pulp, and extracted from the bark and modified with quality certification and in a form that can be applied as per the systems and combination processes claimed herein.

For the sake of convenience, unless otherwise specified, when used herein, the term "tannin" shall mean both purified condensate tannin and modified purified condensate tannin. When used herein, "modified tannin" means natural tannin modified by hydrolysis, sulfonation, methylation, acetylation (acylation), converted to a metal salt, converted to an aldehyde containing compound, converted to a tannin-isocyanate compound or a tannin-protein compound, or a tannin treated compost which has been passivated.

In one embodiment, the tannin to be used as a conditioning composition is a purified form comprised of between 25%-100% polyphenolic condensate tannin content and can be formulated to be incorporated into the nitrogen containing fertilizer before soil application as a coated granular fertilizer, a homogeneous compounded granular fertilizer, a homogeneous granulated fertilizer, a homogeneous prilled granule or melt sourced layered or fluidized bed granulated granule, as an aqueous solution fertilizer of various formulations, or into other forms of fertilizers and mixtures. The coated granular fertilizer is, in one embodiment, comprised of a Tannin-Urea-Formaldehyde coating applied to the nitrogenous fertilizer.

DESCRIPTION OF THE PREFERRED EMBODIMENTS

The present invention comprises of development of nitrification inhibitors from purified tannins such as mimosa tannin, quebreccho tannin, and their derivatives such as tannin aldehydes, useful as conditioners of nitrogenous fertilizers at between 0.1-10% on w/w basis.

In one embodiment, purified mimosa spray dried or particulate tannin, with or without a cross-linking catalyst such as hexamine, or a tannin derivative, is incorporated into the ammonium sulphate manufacturing process, into the crystalline liquor, or into the final particulate forming section, or into a post crystalline ammonium sulphate manufacturing phase to produce a conditioned fertilizer, or if 4-20 mesh size granules are required by compacting, hammer milling and screening the granular particulate, or by pan granulation of powder/crystalline ammonium sulphate and tannin (with or without hexamine, or a tannin derivative such as tannin urea formaldehyde), into a granulated mixture, or into a solution phase Whether the tannin is in solution form, or finely spray dried particulate, or finely ground particulate, or in the form of modified tannin as a binder made from Tannin-Urea-Formaldehyde, or tannin aldehyde compounds, the tannin is predominately a condensate tannin.

In an alternative methodology taught herein, particulate tannin can be incorporated into a urea synthesis liquor, or at the granulating stage, but after the normal 0.5 to 1% formaldehyde (or urea formaldehyde concentrate, or hexamine) granule conditioner or hardener is added to the urea melt. The addition of the tannin, in particular particulate tannin, gives the granules a harder Tannin-Urea-Formaldehyde polymer casing as compared to sole urea formaldehyde polymer.

Tannin, for example fine dry particulate tannin (but also tannin in solution form) can be added before the granulation stage, either at the synthesis section or the concentration (evaporation) phase, or at the urea particulate forming phase such as prilling or granulation. The tannin incorporates into the urea granule by inclusion as well as reaction with formaldehyde through condensation, providing an excellent additional case hardening conditioning of the urea prill or granule, and providing for scavenging of free formaldehyde in the prill, or granule or any subsequent urea solution fertilizer. Although the amount of formaldehyde conditioner is normally small (0.5-1.5% formaldehyde on total urea and formaldehyde (w/w)) the formaldehyde is eventually released because urea, or urea formaldehyde (UF), has a history of releasing formaldehyde to the atmosphere, but the polyphenolic tannin formaldehyde bond is similar to phenol formaldehyde bonding of formaldehyde, and very stable. Up to 10 parts tannin normally reacts with 1 part formaldehyde, w/w.

Where the tannin and a conditioned urea fertilizer are post mixed into solution form, the resulting fertilizer comprises a Tannin-Urea-Formaldehyde polymer formed by condensation reaction. The incorporation of the tannin with the urea solution by inclusion as well as reaction with formaldehyde through condensation, provides an excellent method of post treatment of urea fertilizers, and provides for scavenging of free formaldehyde in the post treated urea solution fertilizer.

In carrying out the practice of the present invention as outlined above, use is made of the mimosa tannin, particularly South African or South American Mimosa spray dried tannin, which is generally the lowest cost material in this large group of natural sourced chemicals, in amounts ranging from between 0.1%-50% percent, but proposed at between 0.1%-10% of the weight of the urea or ammonical fertilizer, for example from between 0.1 percent to about 4.0 percent by weight of tannin to the urea or ammonical fertilizer.

No intermediate processing of said commercially available spray dried tannin is normally required, although a tannin derivative such as a tannin aldehyde may be used, finely ground tannin particulate is acceptable, spray drying thereof to produce a fine powdered form of between 200 and 350 mesh size of the tannin is preferred. The same size of particulate size of tannin would apply to the tannin used for solution forms of fertilizers.

Also tannin may be dry mixed with hexamine particulate at preferred ratios of between 10:0.1 to 10:2.5, or pre-reacted with formaldehyde or urea formaldehyde concentrate 85% (for example UFC-85™), to give a liquid tannin derivative additive to use in the urea melt granulating or prilling stage at the preferred ratio tannin to formaldehyde of between 10:0.1 to 10:2.5 w/w and final tannin formaldehyde combination to give a combination ratio of between 0.5:99.5 to 12:88 w/w tannin formaldehyde to urea so that the mixture is transformed into particulate urea (or ammonical fertilizer melt) by any of the many means well known and practiced in the art, e.g., tower prilling or fluidized bed or layering melt granulation. Since most mimosa tannins are soluble, or dispersible, in the urea melt (or ammonical fertilizer melt), within the limits indicated, there results a completely homogeneous distribution of the tannin, some in the form of Tannin-Urea-Formaldehyde, or tannin aldehyde compounds, in each granule or prill of urea subsequently formed after the mixing step.

Table 1, below, illustrates the inhibition of nitrification for a 2% tannin w/w to fertilizer combination (mimosa tannin on ammonium sulphate) for 1.5-2 weeks longer than control (where no tannin was utilized)

Table 2, below, illustrates the inhibition or delay of both urease and nitrification activity for a 4% (w/w) tannin to fertilizer ratio (mimosa tannin applied on urea) for 3-4 weeks longer than control (urea alone).

Accordingly, the present invention provides for a highly effective controlled release nitrogenous fertilizer composition and processes for the preparation of the said composition which comprises from between 0.1% to 10% w/w tannin/total weight of the fertilizer, of a tannin material such as mimosa tannin and the balance being a nitrogenous fertilizer such as ammonium sulphate or urea.

EXAMPLE 1

Manufacturing of a Controlled Release Nitrogeneous Fertilizer System

Fine particulate dry tannin is incorporated into the melt of a nitrogeneous fertilizer (ammonium sulphate). 0.1-10% w/w fine particulate dry tannin is used, as compared to the weight of the final product (90-99.9% ammonium sulphate is used). For this particular embodiment, 2% (w/w) tannin is used. The nitrogeneous fertilizer melt is processed by evaporation to crystallization, or by crystallization, compounding, hammer milling, and sizing into granular prills.

Crystalline particulate can be used directly in crystalline form as fertilizer, or can be further pan granulated or pelletized to desired sizing between 4-30 mesh., The addition of particulate tannin at the above rates can be added to the crystalline melt or the addition delayed to the crystallization compounding stage, or the pan granulation stage to produce conditioned granules of a controlled release nitrogenous fertilizer.

EXAMPLE 2

Manufacturing of a Controlled Release Nitrogeneous Fertilizer System

Urea is commercially produced by one of two processes: Tower (cooling/drying) urea prilling of evaporization concentrated urea giving a round particulate prill with variation in sizing and hardness, and melt cooling by Fluidized Bed or layering size and hardness control granulation giving higher quality spherical particulate granules.

Where the nitrogeneous fertilizer melt (urea) is processed by evaporation to approximately 95% and Tower prilling, 0.1-10% w/w particulate dry tannin is added to the fertilizer melt before prilling in the Tower.

Where the nitrogeneous fertilizer melt (urea) is processed by Fluidized Bed air cooling and granulation, or layering cooling granulation 0.1-10% w/w particulate dry tannin is added to the fertilizer prior to granulation.

For these particular embodiments, 4% tannin is used in each process.

EXAMPLE 3

Manufacturing of a Controlled Release Nitrogeneous Fertilizer System

Particulate tannin (0.1-10%, in this case, 4%) is pre-reacted in a urea melt containing a standard amount of formaldehyde conditioner, forming a Tannin-Urea-Formaldehyde conditioning agent composition. The urea granule is thought to be bound together by the weak urea formaldehyde polymer binder formed in the melt; the addition of dry tannin is thought to react with the weak binder, forming a stronger, more stable binding Tannin-Urea-Formaldehyde polymer binder that, when solubilized, maintains and even grows its polymer chain stability for inhibiting nitrification of urea (see, for example, table 3).

EXAMPLE 4

Inhibition of Nitrification

An experiment was designed to determine whether mimosa tannin could inhibit the nitrification of two common fertilizers.

Bioreactor cells were set up to hold and grow soil bacteria that would nitrify ammonium sulphate and urea.

Purified tannin used herein is mimosa spray dried tannin and is a mimosa tree bark extract, from Bondtite Corporation, South Africa, sold under the trade code no. Bondtite 345.

EXAMPLE 4A

Ammonium Sulphate

Bioreactor cells were set up to hold and grow soil bacteria that would nitrify ammonium sulphate. The method on which this experiment was conducted is as follows:

1.0 grams of ammonium sulphate ($NH_4SO_4$, DakSul 45, Great Plains Synfuels, Dakota Gasification Company, North Dakota) was placed in a 1 L container, which was then filled with water. The container was shaken to dissolve the ammonium sulphate to form an ammonium sulphate solution.

500 ml of water-washed dry sand was mass measured into each of 2 1 L Bernardin mason glass jars. 1.0 gram of garden soil was added to each jar in order to introduce soil and bacteria. 500 ml of the ammonium sulphate solution was then added to each mason jar containing the sand and soil. Jars were labelled "Tannin" and "Control".

A lid was placed on each jar and the jar was shaken. The lid was then removed, and the contents were allowed to settle so that there was a clear nascent solution on top of the sand. The jars were left at room temperature.

On day 6, 0.01 grams of mimosa tannin (Bondtite 345, Bondtite, Inc, South Africa) was added to the jar labelled "Tannin". (equivalent to 2% w/w tannin (to ammonium sulphate)). Both jars were then shaken again.

The two jars were tested using an ammonia test, a nitrite test, and a nitrate test (NH3/NH4 Tester Kit, NO2 Tester Kit, and NO3 Tester Kits, respectively, Nutrafin, USA). The tests were performed every $7^{th}$ day, until the nitrate value reached approximately 60 ppm (mg/L). A summary of the test results appears in Table 1, below.

TABLE 1

TEST RESULTS FOR NITRIFICATION, Control v. Tannin

| | Control | | | Tannin | | |
|---|---|---|---|---|---|---|
| Week | Ammonia ppm | Nitrite ppm | Nitrate ppm | Ammonia ppm | Nitrite ppm | Nitrate ppm |
| 1 | 0.1 | 0 | 1 | 0.2 | 0 | 1 |
| 2 | 2 | 0.1 | 8 | 1.2 | 0.2 | 1 |
| 3 | 3 | 2.6 | 15 | 2 | 0.2 | 1 |
| 4 | 3 | 2.6 | 45 | 1.6 | 0.2 | 10 |
| 5 | 3.2 | 2.8 | 65 | 3.0 | 0.3 | 50 |
| 6 | 1.0 | 3.2 | 50 | .8 | 2.2 | 48 |

The jar containing tannin provided significant delay of the nitrification of ammonium ion to nitrate (to the end of week 4, vs significant nitrification of ammonium ion to nitrate is delayed only to the end of week 2 in the control jar). Nitrification is delayed a minimum of an additional 2 weeks vs control by the conditioning of ammonium sulphate fertilizer with mimosa tannin vs. control. Delay in nitrification time provided for a longer time for the preferred ammonia phase exposure to plant roots, and hence more agronomic efficiency from the fertilizer. In this case, the fertilizer provided almost 30-50% longer exposure to the ammonia ion.

Note that denitrification commenced in week 5 for the control; denitrification then occurred slowly by week 6. However, for the tannin treated ("Tannin"), denitrification was delayed until week 6, and then denitrification proceeded.

EXAMPLE 4B

Urea

The purpose of this experiment was to determine the effectiveness of purified tannin as a nitrogenous fertilizer conditioning agent that inhibits nitrification in urea.

Bioreactor cells were set up to hold and grow soil bacteria that would nitrify urea in a method similar to that used in Example 1.

6 grams of granular urea containing a formaldehyde conditioning agent (Melt granulated urea, Terra International, Ontario, Canada) was placed in a 1 liter container. 1 liter of water was added. The container was shaken to dissolve the urea and form a urea solution.

500 ml of water-washed dry sand was mass measured into each of two 1 L Bernadin mason glass jars. 1.0 gram of garden soil was added to each jar in order to introduce soil and bacteria. 500 ml of the urea solution was then added to each mason jar containing the sand and soil. Jars were labelled "Tannin" and "Control".

A lid was placed on each jar and the jar was shaken. The lid was then removed, and the contents were allowed to settle so that there was a clear nascent solution on top of the sand. The jars were left at room temperature.

On day 6, 0.12 grams of mimosa tannin (Bondtite 345, Bondtite, Inc, South Africa) was added to the jar labelled "Tannin". (equivalent to 4% w/w tannin to urea). Both jars were then shaken again.

The two jars were tested using an ammonia test, a nitrite test, and a nitrate test (NH3/NH4 Tester Kit, NO2 Tester Kit, and NO3 Tester Kits, respectively, Nutrafin, USA). The tests were performed every $14^{th}$ day, until the nitrate value peaked at over 100 ppm, then fell to approximately 40 ppm for at least one of the jars. A summary of the test results appears in Table 2, below.

TABLE 2

TEST RESULTS FOR UREA NITRIFICATION, Control v. Tannin

| | Control | | | Tannin | | |
|---|---|---|---|---|---|---|
| Week | Ammonia ppm | $NO_2$ Nitrite ppm | $NO_3$ Nitrate ppm | Ammonia ppm | $NO_2$ Nitrite ppm | $NO_3$ Nitrate ppm |
| 1 | 5 | .10 | 6 | 5 | 0.1 | 6 |
| 3 | 10 | 1 | 78 | .1 | 0.1 | 6 |
| 5 | 4 | 1 | 110 | .1 | 0.1 | 6 |
| 7 | 4 | 1 | 90 | .1 | 0.1 | 55 |
| 9 | 4 | 1 | 90 | .3 | 0.3 | 90 |
| 12 | 3 | 1 | 80 | .3 | 0.1 | 40 |

Significant nitrification of urea to nitrate was delayed to the end of week 6 or 7 in the Tannin jar, vs significant nitrification of urea to nitrate delayed only to the end of week 3 in the Control jar. Nitrification was delayed a minimum of an additional 3-4 weeks vs control by the conditioning of urea fertilizer with mimosa tannin. Note that denitrification commenced in week 5 for the Control jar, but only week 9 for the Tannin containing jar. Delay in nitrification time provided for a longer time for the preferred ammonia phase exposure to plant roots, translating to more agronomic efficiency from the urea.

EXAMPLE 5

Tannin-Urea-Formaldehyde (TUF) Conditioning of Urea Fertilizer

The purpose of this experiment was to qualify the reaction of mimosa tannin and the formaldehyde conditioning/hardening agent in commercial urea in order to produce a superior mimosa tannin nitrification inhibiting conditioned urea granule or prill.

100 g of granulated urea and 10 grams of mimosa tannin were dissolved in 1 liter of water, held in a jar and maintained at 21 C for 45 days, and labelled "Treated". A similar control jar with no tannin was also set up, and labelled "Untreated".

150 ml samples of the 1 liter jars were put through a 150 ml pipette to measure relative changes in viscosity in seconds over the 45 days The viscosity was found to increase from initially 5.4 seconds to 8 seconds after 45 days in the "Treated" jar. There was no change in viscosity in the control or "untreated" jar. Results were shown in Table 3, below.

In this experiment the tannin was added to the urea fertilizer in solution. In the manufacturing of urea process, the tannin will react with the formaldehyde conditioner/hardener in the urea melt very quickly because of the high melt temperature. This case hardening of the urea with tannin improves the physical conditioning of the urea granule fertilizer and produces a soil application urea granule that has homogeneous bacterial inhibiting protection from early nitrification via the nitrifying properties of a TUF (Tannin-Urea-Formaldehyde) polymer thoroughly dispersed in the urea granule.

TABLE 3

TEST RESULTS TO DEMONSTRATE AN IMPROVED PROCESS OF PRODUCING TANNIN CONDITIONED IMPREGNATED UREA PRILL OR GRANULE AND TANNIN-UREA-FORMALDEHYDE POLYMER IMPREGNATED UREA

| Day | Viscosity "Treated" | Viscosity "Untreated" |
|---|---|---|
| Tannin and urea - 45 days at 21 C. | | |
| Test every 7 days and return 150 ml back to jar being tested L | Mix 100 grams urea into 1 liter water plus 10 grams tannin in 1 liter Mason Jar Container and store and test via 150 ml Pipette for relative viscosity change with time (Tannin Treated) | Mix 100 Grams urea into 1 liter water in 1 liter Mason jar Container and store and test via 150 ml pipette for relative viscosity change with time (no Tannin-Untreated Urea) |
| Day | Viscosity seconds | Viscosity seconds |
| 1 | 5.4 | 5.4 |
| 7 | 5.85 | 5.4 |
| 14 | 6.2 | 5.4 |
| 34 | 8 | 5.4 |
| 45 | 8.2 | 5.4 |

After 45 days the experiment showed that a Tannin-Urea-Formaldehyde (TUF) polymer was being formed, and then grown by the reactive scavenging of formaldehyde by tannin from the urea formaldehyde conditioning agent and free formaldehyde in urea, plus the integration of urea formaldehyde polymer, and into the TUF polymer chain. The result of introducing tannin into a urea melt granulation or prilling process is the formation of a Tannin-Urea-Formaldehyde derivative that can be used in producing a condensate tannin derived nitrification inhibited urea.

The above noted examples are meant to provide non-limiting exemplifications of the invention. All references cited herein are hereby incorporated by reference.

The invention claimed is:

1. A controlled release nitrogenous fertilizer composition system, comprising:
    (a) a condensate tannin selected from the group consisting of a purified condensate tannin, a purified modified condensate tannin and mixtures/solutions thereof; and
    (b) a nitrogenous fertilizer component selected from the group consisting of an ammonia fertilizer, an ammonium fertilizer, a urea fertilizer, a nitrogen containing fertilizer, a natural nitrogen containing organic fertilizer, a nitrogen containing waste product fertilizer, a slow and control release nitrogenous fertilizer, and mixtures thereof,
    wherein the weight ratio of the tannin to the nitrogeneous fertilizer is from 0.1:99.9 to 10:90.

2. The controlled release nitrogenous fertilizer system of claim 1, wherein the condensate tannin is selected from the group consisting of mimosa tannin, pine tannin, quebracho tannin, hemlock tannin, mangrove bark tannin, gambier tannin, and mixtures/solutions thereof.

3. The controlled release nitrogenous fertilizer system of claim 2, wherein the condensate tannin is mimosa tannin.

4. The controlled release nitrogenous fertilizer system of claim 1, consisting essentially of the tannin and the nitrogeneous fertilizer.

5. The controlled release nitrogenous fertilizer system of claim 1, further comprising a carrier.

6. The controlled release nitrogenous fertilizer system of claim 5, consisting essentially of the tannin, the nitrogeneous fertilizer, and the carrier.

7. The controlled release nitrogenous fertilizer system of claim 5, wherein the carrier comprises formaldehyde.

8. The controlled release nitrogenous fertilizer system of claim 7, wherein the formaldehyde is from 0.5 to 1.5% (w/w) of the system.

9. The controlled release nitrogenous fertilizer system of claim 1, wherein the weight ratio of the tannin to the nitrogeneous fertilizer is from 1:99 to 4:96.

10. The controlled release nitrogenous fertilizer system of claim 9, wherein the weight ratio of the tannin to the nitrogeneous fertilizer is from 2:98 to 3:97.

11. The controlled release nitrogenous fertilizer system of claim 1, wherein the nitrogeneous fertilizer component is selected from the group consisting of ammonium sulphate fertilizer, urea ammonium nitrate liquid fertilizer, anhydrous ammonia, aqueous ammonia, diammonium phosphate, and monoammonium phosphate.

12. The controlled release nitrogenous fertilizer system of claim 1, wherein the nitrogeneous fertilizer component is a nitrogen containing waste product fertilizer selected from the group consisting of manure and animal excretia.

13. The controlled release nitrogenous fertilizer system of claim 1, wherein the nitrogeneous fertilizer component comprises a urea fertilizer selected from the group consisting of formaldehyde conditioned/hardened urea granules and prill fertilizer.

14. The controlled release nitrogenous fertilizer system of claim 1, further characterized as a solid particulate.

15. The controlled release nitrogenous fertilizer system according to claim 14, wherein 90% w/w of the solid particulate has a size which is 200 mesh or smaller, and the remaining 10% w/w of the solid particulate, based on the total weight thereof, has a size which is between 200 mesh and 30 mesh.

16. The controlled release nitrogenous fertilizer system according to claim 14, wherein 99.5% w/w of the solid particulate has a size between 4-100 mesh, and the remaining 0.5% w/w of the solid particulate, based on the total weight thereof, has a size which is smaller than 100 mesh.

17. A method for the manufacturing of a controlled release nitrogenous fertilizer comprising adding a condensate tannin or a modified condensate tannin to a melt, crystalline, or particulate finely divided form of an ammoniacal nitrogeneous fertilizer, wherein the weight ratio of the tannin to the nitrogeneous fertilizer is from 0.1:99.9 to 10:90.

18. The method of claim 17, further comprising following the addition of condensate tannin or modified condensate tannin, a compacting step, a grinding step, and a screening step, to form homogeneous granules.

19. The method of claim 17, further comprising following the addition of condensate tannin or modified condensate tannin, a granulation step wherein the fertilizer is granulated to form homogeneous granules.

20. The method of claim 19, wherein (a) a primary nutrient element, (b) a micronutrient, or (c) a primary nutrient element and a micronutrient are added during the granulation step.

21. A method for the manufacturing of a controlled release nitrogenous fertilizer comprising adding (a) a purified condensate tannin or a modified condensate tannin, and (b) a carrier comprising water, isocyanate, protein, compost or a liquid acid, to a nitrogeneous fertilizer, wherein the weight ratio of the tannin to the nitrogeneous fertilizer is from 0.1:99.9 to 10:90.

22. The method of claim 17 or claim 21, wherein the ammoniacal nitrogeneous fertilizer is selected from the group consisting of an ammonia fertilizer, an ammonium fertilizer, a urea fertilizer, a nitrogen containing fertilizer, a natural nitrogen containing organic fertilizer, a nitrogen containing waste product fertilizer, a slow and control release nitrogenous fertilizer, and mixtures thereof.

23. A method for the manufacturing of a controlled release nitrogenous fertilizer comprising adding a condensate tannin or a modified condensate tannin to a urea melt to produce homogeneous conditioned granules or prills of urea, wherein the weight ratio of the tannin to the nitrogeneous fertilizer is from 0.1:99.9 to 10:90.

24. The method of claim 23, wherein the urea melt further comprises formaldehyde.

25. A method for the manufacturing of a controlled release nitrogenous fertilizer comprising:
(a) dissolving a condensate tannin or a modified condensate tannin in a water carrier;
(b) applying the condensate tannin or modified condensate tannin from step (a) to a manure or an animal excretia fertilizer, either before or after field application of said fertilizer,
wherein the weight ratio of the tannin to the manure or animal excretia fertilizer is from 0.1:99.9 to 10:90.

26. The method of claim 25, wherein the tannin is a mimosa tannin.

27. A controlled release nitrogenous fertilizer composition system, comprising:
(a) a condensate tannin selected from the group consisting of a purified condensate tannin, a purified modified condensate tannin, and mixtures/solutions thereof; and
(b) a nitrogeneous fertilizer component selected from the group consisting of an ammonia fertilizer, an ammonium fertilizer, a urea fertilizer, a nitrogen containing fertilizer, a natural nitrogen containing organic fertilizer, a nitrogen containing waste product fertilizer, a slow and control release nitrogeneous fertilizer, and mixtures thereof,
wherein the weight ratio of the tannin to the nitrogeneous fertilizer is from 0.1:1 to 0.001:1.

* * * * *